Dec. 21, 1943.   H. C. KORNEMANN ET AL   2,337,474
PROCESS OF AND APPARATUS FOR SEPARATING GAS MIXTURES
Filed Oct. 22, 1941   2 Sheets-Sheet 2

INVENTORS
HENRY C. KORNEMANN
EDWARD F. YENDALL
BY
ATTORNEY

Patented Dec. 21, 1943

2,337,474

UNITED STATES PATENT OFFICE 2,337,474

PROCESS OF AND APPARATUS FOR SEPARATING GAS MIXTURES

Henry C. Kornemann, Buffalo, and Edward F. Yendall, Kenmore, N. Y., assignors to The Linde Air Products Company, a corporation of Ohio Application October 22, 1941, Serial No. 416,014

22 Claims. (Cl. 62—175.5)

This invention relates to a process of and apparatus for separating gas mixtures, and more particularly to a process of and apparatus for eliminating higher boiling point impurities prior to the separation of gas mixtures, such as air, by low-temperature rectification. When separating a gas mixture such as air, which contains water-vapor, carbon dioxide and hydrocarbon impurities that have normal boiling points substantially higher than the boiling points of the gases to be separated, such as oxygen and nitrogen, it has been necessary to eliminate the carbon dioxide as well as the water vapor prior to cooling the gas mixture to the low temperatures employed in the rectification. Such carbon dioxide elimination customarily required the use of large lime beds through which the air was drawn, or of scrubbing towers for scrubbing the air with a carbon dioxide absorbing solution, such as a solution of caustic soda.

The presence of hydrocarbons in the air has caused considerable difficulty during air separation because such impurities tend to collect in portions of the rectification apparatus, particularly those portions where the oxygen is produced where they constitute a serious hazard. The hydrocarbons exist in air in relatively minute proportions and are not readily removed during the customary treatment of the air. Additional hydrocarbons are added to the air due to the use of the customary lubricants in the air compressors. Attempts to minimize the hazards caused by hydrocarbon accumulation have included various procedures for separating the impurities from the liquid oxygen. Such methods, however, do not avoid permitting the hydrocarbons to come in contact with high purity oxygen or to enter portions of the rectifying apparatus. It has also been proposed to filter the hydrocarbon impurities from the liquid which is transferred from a high-pressure stage of rectification to a lower-pressure stage of rectification. Such filtration methods, however, do not prevent the entry of the impurities into the high-pressure stage of rectification nor have such methods been successful in removing all of the hydrocarbon impurities, particularly acetylene.

It is a principal object of the present invention to provide an improved method and apparatus for eliminating higher boiling point impurities from a gas mixture to be separated by rectification at low temperatures. Other objects of the invention are to provide a method of and apparatus for preventing impurities contained in air such as carbon dioxide, and hydrocarbons that become solid at low temperatures from entering the rectifying columns of an air-separating apparatus; for eliminating the need of subjecting the air to a special treatment for the removal of carbon dioxide; for employing finely divided solid carbon dioxide to assist in the elimination from the air of more difficultly removable hydrocarbon impurities; for the separation of higher boiling point impurities from air by filtration in a manner that avoids the necessity of filtering the entire amount of air to be separated; for the safe removal of high boiling point impurities that have been separated from air by filtration; and to provide improved apparatus for eliminating higher boiling point impurities from air to be rectified which can be easily added to existing air-separation apparatus without interference with the rectifying column or adversely affecting the efficiency of operation.

These and other objects and advantages of this invention become apparent from the following description and the accompanying drawings in which.

Figure 1:
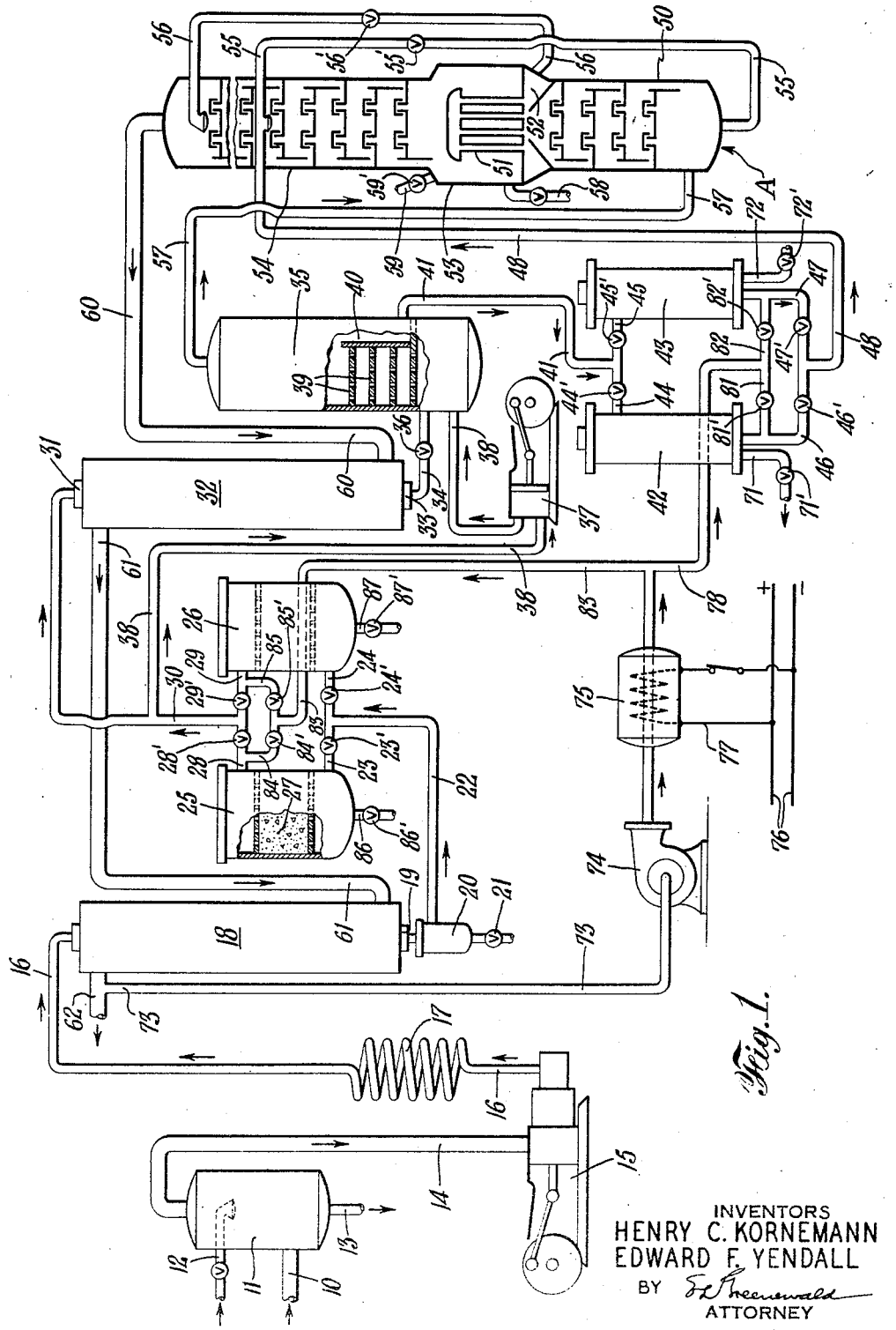
Fig. 1 is a diagrammatic elevational view of an exemplary apparatus illustrating the principles of the invention.

In carrying out the principles of the present invention, the air to be rectified is compressed and cooled in the customary manner, the customary means for removing carbon dioxide, however, being omitted. The drying of the air is preferably carried out in a manner which has no effect upon the carbon dioxide content but moisture removal is preferably effected to attain a high degree of dryness of the air. The compressed air is then cooled while under pressure to a temperature at which a portion of the air is liquefied, and in order to avoid the necessity of filtering the entire quantity of air and for the purpose of bringing the particles of solid $CO_2$ carried by the air and the particles of other impurities into a condition such that they are more readily filterable, all the cold air is subjected to a scrubbing or thorough contacting with liquefied portions of the air at a lower pressure. Such scrubbing causes the impurities and carbon dioxide to be retained by the liquid fractions of the air so that the impurity-free gaseous fraction of the air can be passed directly into the rectifying apparatus. The liquid fraction of the air which now contains all of the impurities is filtered by passing it through one of a pair of duplicate filters. During such filtration, the solid carbon dioxide particles, which are relatively more voluminous than the hydrocarbon particles, collect on the filter surfaces and act as a filter-aid for the removal of the hydrocarbons. The filtered liquid fraction may then be passed directly into a rectifying column, or such filtered liquid may be employed to condense gaseous oxygen produced by the rectification to form liquid oxygen, the filtered liquid being completely vaporized by such heat exchange and the vapors of such vaporization being then passed to the low-pressure stage of the rectifying apparatus.

The procedure for removing the impurities according to the invention is characterized by the separation of the compressed and cooled incoming air into a substantially impurity-free vapor fraction and a liquid fraction which carries the impurities, the filtration of such liquid fraction to remove substantially all the impurities therefrom, and the passage of the impurity-free vapor fraction and the filtered liquid fraction directly to the rectifying apparatus with or without the additional feature of evaporating the filtered fraction prior to passage into the rectifying apparatus.

The invention is further characterized by the omission of a chemical removal of the carbon dioxide from the air so that advantage can be taken of the formation of solid carbon dioxide in the liquid fraction to be filtered to act as a filter-aid for increasing the efficiency of removal of the hydrocarbon impurities, particularly the acetylene.

A further feature of the invention provides a safe and effective removal of the impurities separated by the filters by passing a portion of the nitrogen product of the separation after it has been heated, through one of a pair of filters when such filter is isolated from the air stream and the other filter is in service.

Referring now to Fig. 1, there is illustrated an exemplary arrangement of apparatus for carrying out the principles of the invention which may be applied to a plant producing either liquid or gaseous oxygen. It will be observed that various cycles for the refrigeration and partial liquefaction of the air can be employed, and for drying the air, any of the customary procedures may be employed but it is preferable to employ a drying system which will have no effect upon the carbon dioxide content, such as the drying of the air by refrigeration in alternately operated duplicate forecoolers or by an adsorbent such as silica gel. For convenience of illustration, a drying system employing silica gel is here illustrated.

The air entering the plant through the inlet 10 is preferably washed with water in a scrubber 11 supplied at its upper end with water through a valved connection 12, the wash water leaving the scrubber 11 through the drain 13. It will be observed that such water-scrubbing is not essential for the purpose as other means for cleaning the air can be employed. From the scrubber 11 the air enters through conduit 14 into the lower-pressure cylinder of a multi-stage air compressor 15, which compresses the air to a relatively high pressure which may be as high as 3,000 pounds per square inch. The compressed air leaving the compressor 15 through the pipe 16, is passed through an after-cooling coil 17 and then through the high pressure air tubes of a heat exchanger 18. The lower high-pressure air header 19 of the heat exchanger is connected with a water trap 20 that collects the water that was condensed by cooling the air in the heat exchanger 18. The heat exchanger 18 may be so operated that the air is cooled to a temperature close to but not below 0° C. to avoid freezing of the water. The air however, may be cooled to temperatures below 0° C. to freeze out the moisture on a so-called "slushing cycle" the accumulated moisture being removed by periodically allowing the heat exchanger to warm up above 0° C. and blowing out the slush. Water may be periodically blown from the trap 20 through the drain valve 21. The air leaves the trap 20 through a conduit 22 which has branches 23 and 24 controlled by valves 23' and 24' and which connect conduit 22 to the lower portions of a pair of driers 25 and 26. The driers 25 and 26 are provided with a bed of moisture adsorbent material such as silica gel 27 disposed intermediate the end portions of the driers. The compressed air leaves the upper portion of the driers through branch conduits 28 and 29 of a conduit 30, the branches being controlled by valves 28' and 29' respectively. Conduit 30 conducts a large portion of the air to the upper header 31 of a main continuous countercurrent heat exchanger 32 and from the lower tube header 33 of the heat exchanger 32, a conduit 34 conducts the cold and now partially liquefied air into the lower portion of a scrubber separator 35. The conduit 34 is preferably provided with an expansion valve 36 for reducing the pressure of the air to the pressure of the scrubber 35 which may, for example, be substantially the same as the pressure of the high-pressure stage of rectification or the pressure may be an intermediate pressure somewhat higher.

In some cases it may be desirable to pass all the air through the path constituting the conduit 30, heat exchanger 32, and conduit 34, when it is desired to produce gaseous oxygen. In such case it would be preferable to further cool the air by interposing in conduit 34 before expansion valve 36, a heat exchanger located in the base of the rectifying column A with conduits connecting such heat exchanger with conduit 34 and with valve 36. Such heat exchanger will insure the presence of sufficient liquid air after expansion through valve 36 for the proper scrubbing of the air. However, when liquid oxygen is to be produced, a larger quantity of refrigeration is required and one procedure for obtaining such refrigeration is to effect the expansion of a part of the air in an engine with the production of external work, for example, by an expansion engine 37. The engine 37 receives a substantial portion of the total air through a branch 38 of the conduit 30. In the engine 37, the air is expanded from the high-pressure to the pressure of the scrubber 35 and due to the production of external work, such expansion reduces the temperature of the air to a very low value; such expanded air is then conducted from the engine 37 through a conduit 38 into the lower portion of the scrubber 35.

The scrubber 35 is provided with gas and liquid contact means which preferably comprise a series of perforated plates 39 that have relatively large perforations. The plates 39 are positioned above the inlet conduits 34 and 38 and extend upward for a relatively short portion of the height of the scrubber so as to leave a relatively large space above the plates for the release of any entrained liquid. An overflow cup 40 is preferably provided to maintain the liquid level slightly above the upper plate 39.

The liquid fraction containing the impurities is conducted by a conduit 41 from the cup 40 to a pair of filters 42 and 43. The conduit 41 has two branches 44 and 45 connecting the two respective filters 42 and 43, and the branches 44 and 45 are controlled by valves 44' and 45'. The filtered liquid leaves the filters through respective branch conduits 46 and 47 which are controlled by valves 46' and 47' and join the transfer conduit 48. Conduit 48 conducts the filtered liquid to the rectifying apparatus at a suitable point. If the pressure in the scrubber 35 is maintained at a value higher than the pressure of the high-pressure stage of rectification, then the conduit 48 may connect to the lower column of a two-stage rectifying apparatus of the character illustrated at A. The scrubber pressure, however, can be maintained at a lower value when the filtered liquid is transferred to the low-pressure stage of rectification, the pressure then being that necessary to cause flow of gas through conduit 57.

The rectifying column is of customary construction and comprises a lower column 50 which communicates at its upper end with a condenser 51 and has a liquid collecting shelf 52 disposed immediately below the condenser 51. Surrounding the condenser 51 is an oxygen evaporation chamber 53 which is disposed at the lower end of the upper column 54. Liquid containing oxygen collecting at the lower end of the lower column 50 is transferred by a transfer conduit 55 to an intermediate point of the upper column 54 while liquid, high in nitrogen, collecting at the shelf 52 is transferred through a transfer conduit 56 to the upper end of the upper column to provide a reflux liquid for the column. Conduits 55 and 56 are provided with transfer valves 55' and 56'. The conduit 48 is preferably connected to an intermediate point of the upper column 54. The impurity-free gaseous fraction of the air leaves the scrubber 35 at its upper end through a conduit 57 which conducts such air to the lower portion of the lower column 50. If liquid oxygen is to be produced, such liquid may be drawn from the lower end of the chamber 53 through a valve-controlled connection 58, whereas if gaseous oxygen is to be produced, it is drawn from the chamber 53 through an upper connection 59.

The nitrogen product of the separation passes from the top of the upper column 54 through a conduit 60 to the lower end of the main heat exchanger 32, and after passing in contact with the outside surfaces of the high-pressure air tubes in the heat exchanger and in continuous countercurrent flow with respect to the high pressure air, the nitrogen leaves the upper end of the main heat exchanger 32 through a conduit 61 which conducts it to the lower end of the heat exchanger 18. The nitrogen product leaves the upper end of the heat exchanger 18 through the conduit 62.

Figure 3:
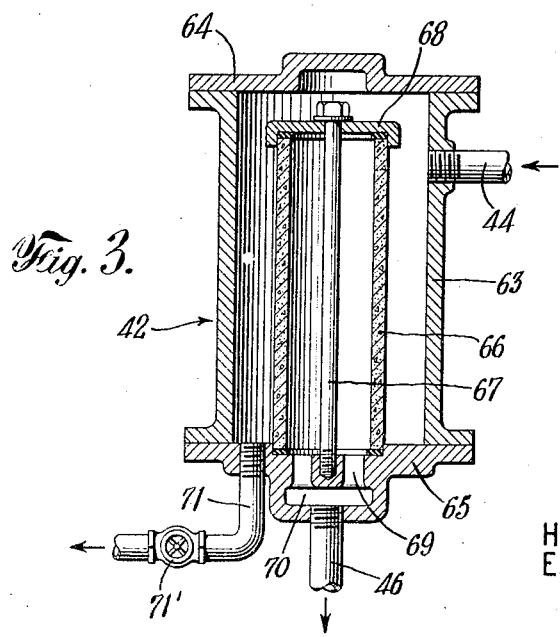
Fig. 3 is a view of a longitudinal section of one of the filtering elements employed in the apparatus of Figs. 1 and 2.

The filtering devices 42 and 43 are similar in construction and therefore the device 42 only is shown in enlarged detail in Fig. 3, which illustrates a preferred construction. The filter 42 comprises a cylindrical shell 63 provided with upper and lower closures or caps 64 and 65. The filtering element is preferably of a material that is inert with respect to liquid air. A suitable material, for example, may be a cylinder of porous ceramic material or a cylinder of porous metal. Such cylinder is indicated at 66 and is preferably secured against the lower cap 65 by a rod 67 which is secured at its lower end to the cap 65 and retains at its upper end a retaining cap 68 that covers and seals the end of the filter cylinder 66. The rod 67 is preferably made of a metal alloy that has the same coefficient of expansion as the material of the filter cylinder 66, so that changes of temperature will have no adverse effect upon the tightness of the seal at each end of the filter cylinder 66. The inlet connection 44 is secured in the wall of the shell 63 to conduct the liquid to be filtered into the space between the cylinder 66 and the shell 63. The filtered liquid leaves the interior of the cylinder 66 through passages 69 connected with an outlet chamber 70 to which the outlet conduit 46 is connected. A cleanout or drain connection 71 controlled by a valve 71' is preferably provided in the cap 65 and is in communication with the space between the cylinder 66 and the shell 63. It will be obvious that if the rate of flow of liquid to be filtered is greater than can be filtered by a single filtering cylinder 66 of given size, that a plurality of filter cylinders 66 could be arranged within an enlarged shell similar to the shell 63. The filter device 43 is similarly provided with a vent 72 controlled by a valve 72'.

In operation, the particles of carbon dioxide collect on the outside surface of the filter cylinder 66 and when a certain amount of the solidified impurities have collected, the pressure drop through the filter will rise and this will serve as an indication that the filter should be taken out of service which is done merely by closing the valves 44' and 46' and opening the valves 45' and 47'. With the valves 44' and 46' closed, the filter device 42 is ready to be purged of the collected impurities. Various ways of purging the filter can be practised, for example, by simply warming up the filter device, the impurities will be gasified and may be blown off through the connection 71 by the opening of the valve 71'. A more positive cleaning out of the filter, however, is conveniently practised by drawing from the outlet 62 a portion of the dry waste nitrogen through a conduit 73 leading to the inlet of a gas moving device or blower 74. The dry nitrogen discharged by the blower 74 is passed through a chamber 75 containing a heating element for warming the gas to a desired temperature, the heating element being supplied with electric power from busses 76 by connections 77. The heated nitrogen passes through conduit 78 to one of two branch connections 81 or 82 controlled by valves 81' and 82'; the connection 81 communicating with the outlet 46 and the connection 82 communicating with the outlet 47 of the respective filters 42 and 43.

When it is desired to thaw out a filter device such as the filter device 42, the blower 74 is started, the heater 75 energized, valve 71' opened and the valve 81' is opened, warm gas then flows in through the connection 46 to the interior of the filter cylinder 66, passes through the filter and then out through the vent 71. In this manner the rod 67 and filter cylinder 66 are warmed up substantially at the same rate so that no differential expansion occurs. In this way, substantially all the material collected by the filter 66 is vaporized and blown out. When the filter device 42 is sufficiently purged, it will be ready to be put back into service by closing valves 71' and 81'. When the purged warmed filter 42 is to be put into service, it should preferably be cooled down gradually by first opening the valve 71' and cracking the valve 44' to allow a very small flow of liquid to pass into the filter, such liquid of course will at first vaporize and the vapors will be blown out through the purge connection 71. When the filter cylinder 66 has cooled to a sufficiently low temperature so that none of the solid impurities would be gasified, the purge valve 71' can be closed and the discharge valve 46' opened. The valve 44' may then be opened sufficiently to regulate the flow during the time that the valve 45' is being closed off to take out of service the other filter device 43. When the filter 42 is fully in service, the valve 44' is preferably employed as the pressure reducing valve for reducing the pressure of the liquid to be filtered from the pressure of the scrubber 35 to the pressure of the rectifying stage to which the filtered liquid is conducted. In an apparatus of the type illustrated in Fig. 1 such pressure reduction will be from about 75 pounds per square inch gauge to about 7 pounds per square inch gauge which is the pressure that may exist in the upper column 54.

For the proper operation of the silica gel driers 25 and 26, the heated dry nitrogen gas supplied through the conduit 78 may be conducted by a branch conduit 83 to a pair of connections 84 and 85 controlled by valves 84' and 85', which connect to the inlets 28 and 29 of the driers 25 and 26. The driers 25 and 26 are provided with vent connections 86 and 87 respectively, controlled by valves 86' and 87'. When one of the driers, for example the drier 25, is to be revivified, the valves 23' and 28' are closed and the valves 84' and 86' opened. Warm nitrogen then passes through the conduit 83, branch 84, connection 28 into the upper end of the drier chamber 25, down through the silica gel 27, where the nitrogen takes up moisture from the silica gel and is blown out through the vent 86. To put the drier back in service after the gel 27 has been reactivated, the valves 84' and 86' are closed and the valves 23' and 28' are opened.

Figure 2:
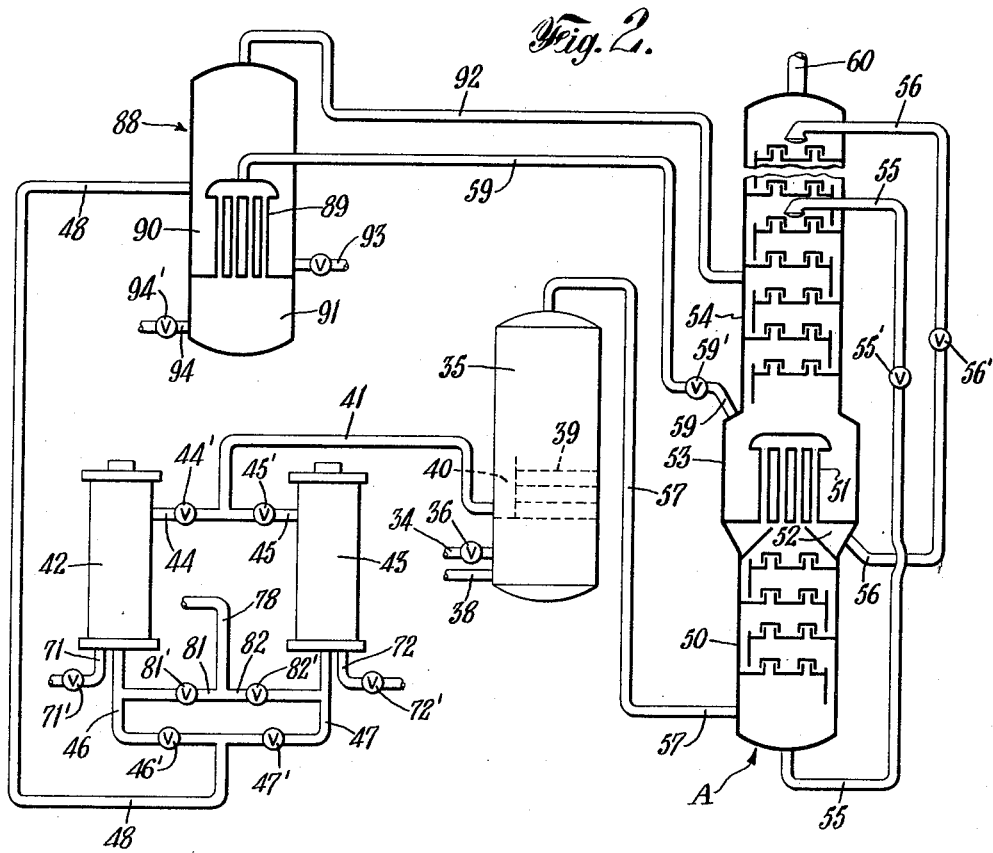
Fig. 2 is a similar view of a portion of another form of apparatus embodying the principles of the invention.

Referring now to the embodiment of the invention illustrated in Fig. 2, elements similar to those shown in Fig. 1 are referred to by similar reference characters. In this form of the invention, the filtered liquid is employed for the recondensation of gaseous oxygen and is itself regasified. Such additional step has the further advantage of insuring the production of liquid oxygen of great purity, that is, substantially entirely free of any hydrocarbon impurities. In the form of the invention illustrated in Fig. 2, there is provided a so-called auxiliary condenser indicated generally at 88. The auxiliary condenser comprises a condenser element 89 disposed within an evaporating chamber 90 and having a condensate chamber 91 at its lower end. The filtered liquid is conducted from the filter elements 42 or 43 through the conduit 48 which is connected to discharge the filtered liquid into the chamber 90. The vapors produced by the evaporation of such filtered liquid around the outside of the tubes of the condenser 89 pass from the top of the chamber 90 through a conduit 92 to an intermediate part of the upper column 54. A drain connection 93 at the lower end of the chamber 90 is provided so that small portions of liquid may be drained from the chamber 90 at certain intervals to remove any accumulated impurities that may collect therein as a result of the evaporation of the filtered liquid. The gaseous oxygen product of the rectification column is discharged through the conduit 59 which is controlled by a regulating valve 59' and is passed into the condenser 89. By heat exchange with the liquid in the chamber 90, the gaseous oxygen is condensed to form liquid oxygen which collects in the chamber 91 from which it is discharged to liquid oxygen storage tanks through the connection 94 which is controlled by a valve 94'.

For the proper operation of the embodiment shown in Fig. 2, it is essential that the refrigeration cycle employed supply not only sufficient refrigeration to balance the work of the gas separation, heat exchange losses, and heat leakage through the insulation which protects the various elements of apparatus, but also enough to balance that contained in the liquid oxygen product removed through conduit 94. It is therefore preferable to provide a refrigeration cycle employing an expansion engine similar to the engine 37 shown in Fig. 1. When the moisture is removed by heat exchangers refrigerated by an independent refrigeration cycle, for example, a carbon dioxide or ammonia refrigerating system, in place of the silica-gel devices 25 and 26, the refrigeration added to the air will permit a reduction of the refrigeration work of the main air refrigeration cycle and therefore the pressure maintained by the main compressor 15 can be lower than is necessary when silica-gel driers are used as in Fig. 1.

It will be seen that the present invention makes possible an appreciable saving in operating costs and of plant apparatus by eliminating the necessity for removing carbon dioxide prior to the cooling of the air to low temperatures in countercurrent heat exchangers. Heretofore, it was thought that such elimination of prior carbon dioxide removal would be impossible because, according to previous experience, the countercurrent heat exchangers would plug up in the zones where the temperature was equal to or below the freezing point of carbon dioxide.

By operating according to the principles of the present invention it has been discovered that the countercurrent heat exchanger 32 will operate continuously without clogging. The expansion engine 37 and the expansion valve 36 also pass the particles of solid carbon dioxide without any of the expected clogging difficulties. It is believed that an important factor in preventing adherence of solid carbon dioxide in the heat exchanger is the removal of water vapor from the air to a higher degree of dryness than has been previously customary. Another factor may be the employment of heat exchanger passages with less restrictions and with relatively high rates of flow and less curvature in zones where the solid carbon dioxide is formed.

While several arrangements have been described and two embodiments of exemplary apparatus have been illustrated in order to disclose the principles of the present invention, it will be obvious that modifications may be made without departing from the essentials of the invention. Although the invention has been described in detail in connection with the separation of air to produce oxygen, the invention is not limited to such use but the principles of the method and apparatus can be applied in the low temperature liquefaction and/or separation of other gas mixtures containing carbon dioxide such as for example the separation of coke oven gases or the liquefaction of natural gas to avoid the necessity for chemical removal of the carbon dioxide.

We claim:

1. A process for the elimination of higher boiling point impurities in the separation of air by liquefaction and rectification in stages operating at successively lower pressures which comprises compressing the air to a relatively high pressure; cooling such air to a temperature not substantially lower than 0° C. to condense a portion of the moisture in the air; removing the condensed moisture; drying the compressed and cooled air to remove substantially all the moisture remaining therein; further cooling and partially liquefying such dried air while it is under said high pressure by heat exchange between the air and the nitrogen product of the rectification in continuous countercurrent flow, whereby said higher boiling point impurities in the air including carbon dioxide become solidified and are carried in suspension by the cold air in a finely divided state; scrubbing the gaseous fractions of said cooled air with the liquid fractions thereof whereby said impurities are retained substantially entirely in the liquid fraction; passing the impurity-free gaseous fractions of the air directly into a higher pressure stage of the rectification; filtering said carbon dioxide and other impurities out of said liquid fraction; and passing such filtered fraction to the last or lowest pressure stage of rectification.

2. Process for the elimination of higher boiling point impurities in the separation of air by liquefaction and rectification according to claim 1, in which said compressed and cooled air is dried by effecting contact with a moisture removing agent that is inert to the carbon dioxide in the air.

3. A process for the elimination of higher boiling point impurities in the separation of air by liquefaction and rectification in stages operating at successively lower pressures which comprises compressing the air to a relatively high pressure; cooling such air to a temperature sufficient to effect condensation of a portion of the moisture in the air; removing the condensed moisture; drying the compressed and cooled air to remove substantially all the remaining moisture therein; dividing such dried air into two portions; further cooling and partially liquefying one portion of such dried air while it is under said high pressure by heat exchange with gaseous products of the rectification in continuous contercurrent flow, said impurities including carbon dioxide becoming solidified and carried by the cold air in a finely divided state; expanding such cooled partly liquefied portion of air to an intermediate pressure; expanding with the production of external work and without liquefaction the other of said two portions of dried air; mixing and scrubbing the gaseous fractions of all of such expanded air with the liquid fraction of the expanded partly liquefied portion whereby said impurities are retained substantially entirely in the liquid fraction; passing the impurity-free gaseous fractions of the air directly into a higher pressure stage of the rectification; expanding said liquid fraction from the intermediate pressure to a lower pressure thereby further decreasing the solubility of the impurities; then filtering said expanded liquid fraction to separate carbon dioxide and other impurities therefrom; and passing such filtered fraction to the last stage of rectification.

4. Process for the elimination of higher boiling point impurities in the separation of air by liquefaction and rectification according to claim 3 which includes the step of completely vaporizing said filtered fraction by heat exchange with the gaseous oxygen product of the rectification to condense said oxygen product and then passing the vapors of said filtered fraction to the last stage of rectification.

5. A process for the elimination of higher boiling point impurities in the separation of air by liquefaction and rectification in stages operating at successively lower pressures which comprises compressing, cooling and drying the air to remove substantially all the moisture therefrom; further cooling and partially liquefying at least a portion of the compressed and dried air while it is under said high pressure by heat exchange with a gaseous product of the rectification in continuous countercurrent flow whereby said impurities including carbon dioxide become solidified and carried by the cold air in a finely divided state; scrubbing the gaseous fraction of said cold air with the liquid fraction thereof at an intermediate pressure, said impurities being retained in said liquid fraction; separating the impurity-free gaseous fraction for passage directly into a higher pressure stage of rectification; separating said impurities from said liquid fraction by filtration at low temperature; and passing such filtered fraction to the last or lowest pressure stage of rectification.

6. In a process for the separation of gas mixtures having normal boiling points below 216° K. containing carbon dioxide, by liquefaction and rectification the steps of compressing and cooling such gas mixture to substantially the condensation temperature of at least one of the components to be separated whereby said carbon dioxide is converted into a finely divided solid state in the gas stream; liquefying a portion of such cooled gas mixture while under pressure; reducing the pressure of the gas stream; effecting the removal of said solid carbon dioxide particles from the gas by filtration in filtering devices arranged in duplicate; and removing the solid carbon dioxide collected by one of said devices by passing through said device when isolated from said gas stream, a warm dry gas whereby said solid carbon dioxide is vaporized and carried off by said warm gas.

7. In a process for the separation of gas mixtures having normal boiling points below 216° K. containing impurities including carbon dioxide, by liquefaction and rectification the steps of compressing and cooling such gas mixture to substantially the condensation temperature of at least one of the components to be separated whereby said impurities are converted into a finely divided solid state in the gas stream; liquefying a portion of such cooled gas mixture while under pressure; reducing the pressure of the gas stream; effecting the concentration of said impurities substantially entirely in the liquid fraction of the gas mixture; removing said impurities from said liquid fraction by filtering the liquid through impurity collecting devices at relatively low temperature; isolating one of said devices containing collected impurities; and vaporizing and driving off said collected impurities by passing through said isolated device a portion of relatively warm dry product of the separation.

8. In a process for the separation of gas mixtures having normal boiling points below 216° K. and containing carbon dioxide, by liquefaction and rectification the steps of compressing and cooling such gas mixture to substantially the condensation temperature of at least one of the components to be separated whereby said carbon dioxide is converted into a finely divided solid state in the gas stream; liquefying a portion of such cooled gas mixture while under pressure; reducing the pressure of the gas stream; scrubbing the cooled gas mixture with the liquefied fraction of the gas mixture to retain said carbon dioxide in said liquid fraction; separating the carbon dioxide free gaseous fraction from the carbon dioxide containing liquid fraction; filtering the solid carbon dioxide from said liquid fraction at a relatively low temperature; and passing both carbon dioxide free fractions to rectification apparatus for rectification.

9. Process for the elimination of carbon dioxide impurities in the separation of gas mixtures by liquefaction and rectification according to claim 8 in which said scrubbing is carried out at an intermediate pressure higher than the rectification pressure, and said liquid fraction is expanded to a pressure substantially equal to said rectification pressure prior to said filtration.

10. A process for the elimination of higher boiling point impurities in the separation of air by rectification in stages operating at successively lower pressures which comprises compressing, cooling and drying the air to remove substantially all the moisture from the air; further cooling and partially liquefying the compressed air by dried air while it is under said high pressure by heat exchange with the nitrogen product of the rectification in continuous countercurrent flow whereby said impurities including carbon dioxide become solidified and carried by the cold air in a finely divided state; scrubbing the gaseous fraction of said cold air with the liquid fraction thereof at an intermediate pressure, said impurities being retained in said liquid fraction; separating the impurity-free gaseous fraction for passage to said rectification; separating said impurities from said liquid fraction by filtration; substantially completely vaporizing said filtered fraction at a relatively low temperature; and then passing the vaporized filtered fraction to said rectification.

11. A process for the elimination of higher boiling point impurities in the separation of air by liquefaction and rectification according to claim 10 in which said filtered fraction is completely vaporized by heat exchange with the gaseous oxygen product of rectification to condense said oxygen product and the vaporized filtered fraction is passed to the last or lowest pressure stage of rectification.

12. In a process for the separation of air containing higher boiling point impurities by liquefaction and rectification the steps of compressing, cooling and partially liquefying the air under pressure whereby said impurities are converted into a finely divided solid state in the air stream; reducing the pressure of said air stream; separating said finely divided solid impurities from the air by filtration; then separating additional impurities remaining in the liquid portions of the air in a liquid or a dissolved state after said filtration by effecting the vaporization at low temperature of such impurity-containing liquid portions before passage thereof to rectification stages, and withdrawing the residue of such vaporization.

13. Apparatus for eliminating higher boiling point impurities prior to the separation of air by low-temperature rectification in staged rectifying columns which comprises means for compressing, cooling and drying air to be separated, continuous countercurrent heat exchanger means for further cooling and partially liquefying such dried air while under high pressure by heat exchange with the nitrogen product of rectification so that the higher boiling point impurities including carbon dioxide become solidified and carried by the air in a finely divided state; means for expanding such partly liquefied air; a scrubber-separator for scrubbing the gaseous fractions of the expanded cold air with the liquid fractions and separating the impurity-free gas fraction; means for passing the impurity-free gas fraction to a higher pressure stage of the rectifying columns; a filtering device for filtering the solid impurities out of said liquid fraction; and means for passing such filtered fraction to the last or lowest pressure stage of the rectification.

14. Apparatus for the elimination of carbon dioxide and like impurities from gas mixtures containing the same prior to low-temperature separation of such gas mixtures in separating columns which apparatus comprises means for cooling and partially liquefying such gas mixture under pressure so as to convert the carbon dioxide into a finely divided state suspended in the gas stream; means for expanding such partly liquefied gas stream; a scrubber separator for scrubbing the expanded gas mixture with a liquid fraction thereof to retain the carbon dioxide in the liquid and separating the gaseous fraction free of carbon dioxide; a filtering device connected to receive said liquid fraction from said scrubber separator to filter said liquid fraction; and means for passing both carbon dioxide free fractions to said separating columns.

15. Apparatus for eliminating carbon dioxide from gas mixtures containing the same prior to low-temperature separation of such gas mixtures according to claim 14 in which said scrubber separator is operated under a pressure higher than that of the separating columns and an expansion device is connected between said scrubber separator and said filtering device to further reduce the pressure and temperature of said liquid fraction prior to filtration.

16. Apparatus for eliminating carbon dioxide from gas mixtures containing same prior to low temperature separation of such gas mixtures according to claim 14 including means for passing the carbon dioxide free gaseous fraction from the scrubber separator directly to a higher pressure stage of said rectifying columns and means for passing said filtered fraction to a lower pressure stage of said rectifying columns.

17. Apparatus for eliminating higher boiling point impurities prior to the separation of air by rectification in staged columns at successively lower pressures which includes means for compressing, cooling and drying the air substantially free of all moisture; continuous countercurrent heat exchange means for partially liquefying such cooled air under pressure; means for expanding such partly liquefied air; a scrubber separator connected and arranged to receive such expanded air, to scrub the air with the liquid fraction of the air, and to separate the scrubbed impurity-free air from the liquid fraction retaining the impurities; a filtering device for filtering the impurities from said liquid fraction; and means for passing the impurity-free gas fraction and the filtered liquid fraction to said separating column apparatus.

18. Apparatus for eliminating higher boiling point impurities according to claim 17 which includes means for substantially completely vaporizing said filtered fraction prior to passage into said separating column apparatus.

19. Apparatus for eliminating higher boiling point impurities according to claim 17 in which said filtering device comprises filter units arranged in parallel each having inlets and outlets controlled by stop valves for isolating a desired unit from the gas stream; and including means for heating such isolated filter unit for vaporizing and driving off accumulated impurities.

20. Apparatus for eliminating higher boiling point impurities from air immediately prior to the separation of air by rectification at low temperature which comprises filter units arranged in parallel having inlets and outlets controlled by stop valves, each said filter unit comprising a hollow filter surrounded by a chamber, said inlet being connected to said chamber and said outlet being connected to the interior of said hollow filter, and a vent connected to said chamber; and means for supplying a warm dry gas for vaporizing said impurities and removing them from the filter unit, including a conduit connecting to said outlet on the filter side of the valve therein whereby said warm gas may be passed into the interior of said hollow filter, through said filter into the chamber and out of the chamber through said vent.

21. Apparatus for eliminating higher boiling point impurities according to claim 17 which includes a condenser-vaporizer arranged to receive and condense an oxygen product of the last-stage column by heat exchange with the filtered fraction of said air in the vaporizer side of said condenser, means for withdrawing liquid oxygen product from the condenser side, means for passing filtered fraction from said filter devices to said vaporizer side of the condenser, and means for passing the vapors produced on the vaporizer side of said condenser to an intermediate point of the last-stage rectifying column.

22. A filter unit for eliminating higher boiling point impurities from air prior to the separation of air by rectification which comprises a hollow cylindrical filter element; a chamber surrounding said filter element and having an end closure, said filter element having one end secured against said end closure; a cap closing off the other end of said filter element; an axial rod connecting said cap and said end closure for securing said filter element therebetween; an inlet connected to said chamber; an outlet connected to said end closure for communication with the interior of said filter element; a vent connected to said chamber; and a purging gas inlet connection communicating with the interior of said filter element.

HENRY C. KORNEMANN.
EDWARD F. YENDALL.